(No Model.)

T. GÖTZEL.
HOSE COUPLING.

No. 266,359. Patented Oct. 24, 1882.

WITNESSES:
Jul. H. Rosenbaum.
Otto Risch.

INVENTOR
Theodor Götzel
BY Paul Goepel.
ATTORNEY

N. PETERS. Photo-Lithographer, Washington, D. C.

UNITED STATES PATENT OFFICE.

THEODOR GÖTZEL, OF NEW YORK, N. Y.

HOSE-COUPLING.

SPECIFICATION forming part of Letters Patent No. 266,359, dated October 24, 1882.

Application filed June 6, 1882. (No model.)

*To all whom it may concern:*

Be it known that I, THEODOR GÖTZEL, of the city, county, and State of New York, have invented certain new and useful Improvements in Hose-Couplings, of which the following is a specification.

This invention has reference to an improved hose-coupling which can be quickly connected or detached; and the invention consists of a female section that interlocks by means of flanges and intermediate recesses with a male section having corresponding flanges and recesses, said male and female sections being then automatically secured together by a spring-acted and axially-turning bolt of the male section, which enters radial face-recesses of the female section.

Figure 1:
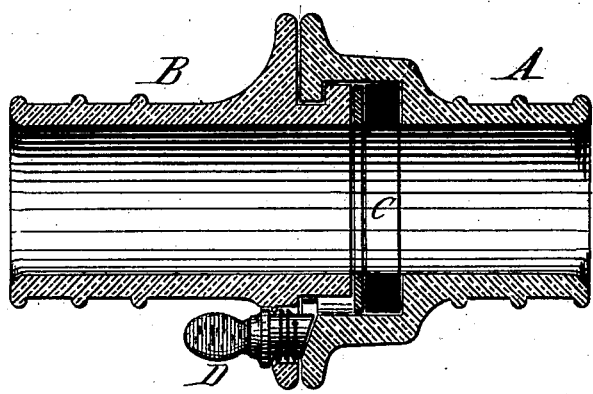
Figure 2:
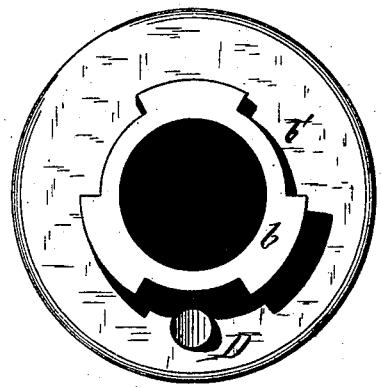
Figure 3:
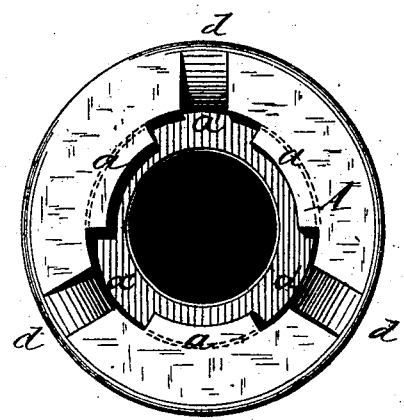
Figure 4:
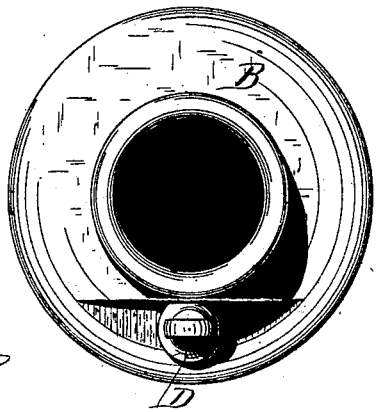

In the accompanying drawings, Figure 1 represents a vertical longitudinal section of my improved hose-coupling. Figs. 2 and 3 are end views respectively of the male and female sections of the same, and Fig. 4 is an end view taken from the opposite side of the male section of my hose-coupling.

Similar letters of reference indicate corresponding parts.

By reference to the drawings, A represents the female, and B the male, section of my improved hose-coupling. The female section A is provided at its face part with locking-flanges $a$ and intermediate recesses $a'$. The male section B is also provided with interlocking flanges $b$ and intermediate recesses $b'$, which correspond in size respectively to the recesses $a'$ and flanges $a$ of the female section, so that by introducing the male section into the female section and turning them in opposite direction to each other the flanges of the two sections interlock with each other. To retain the tight connection of the male and female sections, a rubber packing-ring, C, of suitable thickness is interposed between an interior shoulder of the female section and the flanges of the male section, as shown in Fig. 1, said packing-ring being preferably faced by a metallic washer to prevent wear and injury to the packing-ring C.

To prevent the detaching of the male and female sections of the coupling while in use, I employ an auxiliary locking device, which is thrown automatically into action after the flanges of the male and female sections have been locked to each other. This auxiliary locking device consists of a guided and a spring-pressed bolt, D, that is placed in a socket of the exterior flange of the male section and made beveled at the under side. The bolt D locks into correspondingly beveled radial face-recesses $d$ of the female section A, which face-recesses are arranged at the center of the recesses $a'$ of the female section A. As soon as the two sections of the coupling are connected the locking-bolt is thrown by its spring automatically into one of the recesses $d$ of the female section, whereby the reliable connection of the sections is produced. To facilitate the disconnection of the male and female sections, the locking-bolt D is turned by its handle around its axis, so that its beveled end passes more readily over the side of the recess $d$, after which the male and female sections are turned in opposite directions until their locking-flanges are in line with their recesses, when the sections will come apart in the usual manner.

I do not claim the connection of the male and female sections by means of the locking-flanges and intermediate recesses and an interior packing-ring, as this has been used heretofore in hose-couplings; but I claim the combination therewith of an auxiliary automatically-working locking device, whereby the quick and reliable connection of the male and female sections, without any possibility of their being disconnected, is obtained.

Having thus described my invention, I claim as new and desire to secure by Letters Patent—

The combination of a female section, A, having locking-flanges $a$ and intermediate recesses $a'$, with the male section B, having locking-flanges $b$ and intermediate recesses $b'$, and interposed packing-ring, C', a spring-pressed and axially-turning locking-bolt, D, set into a socket of the male section, said bolt being beveled at the under side and adapted to take into beveled radial face-recesses $d$ of the female section, all substantially as and for the purpose set forth.

In testimony that I claim the foregoing as my invention I have signed my name in presence of two subscribing witnesses.

THEODOR GÖTZEL.

Witnesses:
PAUL GOEPEL,
SIDNEY MANN.